United States Patent

[11] 3,603,045

| [72] | Inventor | Perceptimus J. Mighton |
| | | Tulsa, Okla. |
| [21] | Appl. No. | 722,814 |
| [22] | Filed | Apr. 1, 1968 |
| [45] | Patented | Sept. 7, 1971 |
| [73] | Assignee | Mary C. Harter |
| | | Tulsa, Okla. |

[54] MACHINE TOOL
2 Claims, 5 Drawing Figs.

[52] U.S. Cl. .................................................. 51/170 R
[51] Int. Cl. .................................................. B24b 23/00
[50] Field of Search ................................................. 51/170,
241, 245, 241.1; 173/163, 59; 30/352; 77/71–75;
145/11 L; 51/170

[56] References Cited
UNITED STATES PATENTS

| 1,387,994 | 8/1921 | Lewis | 408/224 |
| 1,864,027 | 6/1932 | Pedersen | 173/59 X |
| 2,561,472 | 7/1951 | Hawkinson | 77/72 X |
| 2,914,305 | 11/1959 | Wink | 173/163 X |
| 2,780,966 | 11/1957 | Frost et al. | 90/12 |
| 2,763,461 | 9/1956 | Hill | 51/245 UX |

FOREIGN PATENTS

| 568,813 | 4/1945 | Great Britain | 173/59 |

Primary Examiner—Othell M. Simpson
Attorney—William S. Dorman

ABSTRACT: A cutting or machining tool threadedly secured directly to the output shaft of an air motor, or the like, and having means for directing the air which operates the motor onto the cutting tool to keep the tool cool during a machining operation, thus precluding undue heating of the tool and the workpiece.

INVENTOR.
Perceptimus J. Mighton
BY
William S. Dorman
ATTORNEY

INVENTOR.
Perceptimus J. Mighton
BY
William S. Dorman
ATTORNEY

MACHINE TOOL

This invention relates to machine tools and more particularly but not by way of limitation, to a machining or cutting tool in combination with an air motor.

There are many instances wherein it is desirable to provide a cutting tool for grinding or machining a beveled end of a tubular member or pipe section. For example, the internal pipe-beveling apparatus as shown in my copending application Ser. No. 570,978, filed Aug. 8, 1966, and entitled "Pipe Beveling Attachment for Pipe Beveling Machines," utilizes a grinding tool for providing a smooth surface for the beveled edge or beveled end of a pipe section, either on the outer periphery thereof or on the inner periphery thereof. As a practical matter, it is very desirable to utilize an air motor for the power source for the grinding or machining tool since air is usually available at the site wherein this type of operation is performed.

In actual working conditions, it has been found that the usual chucking means for securing the cutting or grinding tool to the usual air motor available today does not hold the cutting tool sufficiently tight to preclude slippage of the tool during this type of machining operation. As a result, it has been found that the tool may be threadedly secured directly to the drive shaft of the air tool in such a manner as to hold the tool against accidental dislodgment during the grinding operation. This created an additional problem in that the usual air motor of today is not provided with a drive shaft which is sufficiently long to permit securing of the air motor to the beveling apparatus and position the cutting tool against the end of the pipe being machined.

The present invention contemplates a novel machining tool, grinding tool, cutting tool, or the like, wherein the cutting tip or tool is threaded directly to the outer end of the drive shaft of an air motor. Of course, in instances wherein the drive shaft is not sufficiently long to permit utilization of the cutting tool as desired, an extension may be interposed between the tool and the drive shaft, but the extension becomes essentially an integral part of the drive shaft and the overall result is the same as if the tool were threaded directly to the outer end of the drive shaft. In addition, an extension cover or cowl member is secured to the leading or forward end of the air motor and is so designed and constructed for channeling the exhaust air from the motor directly onto the cutting tool. It has been found that this constant stream of air moving over the cutting element during a machining operation maintains the cutting element at a relatively cool temperature throughout the use thereof. This not only prolongs the useful life of the cutting element itself, but also greatly reduces the transference of any heat to the work piece, thus substantially eliminating the detrimental results of frictional heat.

It is an important object of this invention to provide a novel machining tool wherein the cutting, grinding, or machining element, or the like, is particularly designed and constructed for being secured to the drive shaft of an air motor, or the like, in such a manner as to provide a direct drive connection therebetween.

It is another object of this invention to provide a novel machining tool wherein the air from an air motor is channeled onto cutting or grinding element, or the like, during the operation thereof for maintaining a relatively cool temperature for the cutting element during a machining operation.

A further object of this invention is to provide a novel machining tool which is simple and efficient in operation and economical and durable in construction.

Other and further objects and advantageous features of the present invention will hereinafter more fully appear in connection with a detailed description of the drawings in which.

Figure 1:
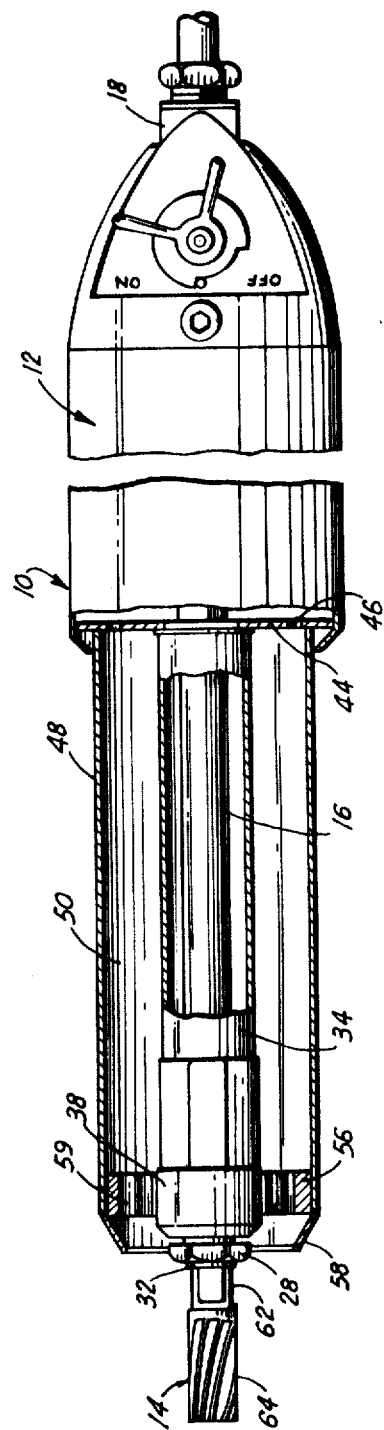
FIG. 1 is an elevational view partly in section of a machine tool embodying the invention.
Figure 2:
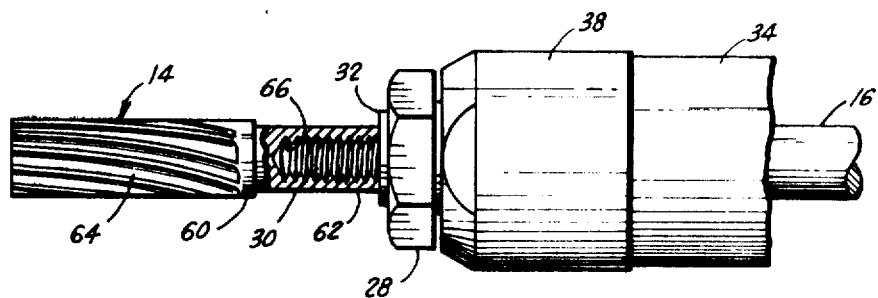
FIG. 2 is a side elevational view partly in section depicting the machining element secured to the shaft of a motor, with portions eliminated for purposes of illustration.

Referring to the drawings in detail, reference character 10 generally indicates a machining tool comprising an air motor 12 and a machining element 14 secured thereto in a manner as will be hereinafter set forth. The air motor 12 may be of any suitable type and is provided with an output or drive shaft 16 which is rotated thereby, as is well known. Of course, the usual fitting 18 is provided on the motor 12 for receiving the supply of air or power fluid for directing the air into the interior of the motor for actuation thereof in any well known manner whereby the shaft 16 will be rotated during operation of the device 10.

Figure 5:
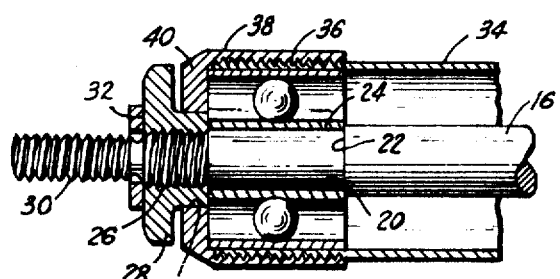
FIG. 5 is an enlarged sectional view, partly in elevation, of a portion of the drive shaft and protector sleeve of the invention.

In the event the shaft 16 of the motor 12 is not of sufficient length it will be apparent that an extension member (not shown) may be secured thereto in any suitable manner, or the original shaft of the motor 12 may be replaced by a similar shaft of the desired length as depicted herein in order to assure substantially any desired length for the shaft. The outer extremity of the shaft 16 may be reduced at 20 (FIG. 5) to provide an annular shoulder 22 for receiving a suitable bearing member 24 thereagainst. The forward or outer end of the reduced portion 20 is threaded at 26 for receiving an internally threaded nut 28 thereon. The nut 28 engages the bearing 24 for retaining the bearing 24 securely in position. The shaft 16 may be further reduced at 30 and is externally threaded for receiving the machining element 14 thereon as will be hereinafter set forth in detail. In addition, an annular washer or ring 32 may be disposed on the threaded end 30 and interposed between the nut 28 and element 14 whereby the element 14 may butt against the ring 32 in the fully engaged or tightened position of the element 14 on the shaft 16.

A protector and support sleeve 34 is concentrically disposed around the shaft 16 and is secured to the air motor 12 in any well-known manner (not shown). The sleeve 34 extends axially outwardly from the air motor and around the shaft 16 as clearly shown in the drawings and is preferably of a slightly shorter length than the shaft 16. The outer end of the sleeve 34 extends over the bearing 24 and the outer periphery thereof is threaded at 36 for receiving an end cap member 38 thereon. One end of the cap 38 is provided with an inwardly directed annular flange 40 providing a central bore 42 for receiving the nut 28 therethrough whereby the nut 28 may rotate freely with respect to the cap 38 and sleeve 34 and simultaneously with the shaft 16.

The leading or front end of the motor 12 is provided with an inwardly directed annular shoulder or flange 44 surrounding the sleeve 34 for closing the forward or front portion of the motor. A plurality of circumferentially spaced apertures 46 are provided in the flange 44 for directing the exhaust air from the motor 12 in a longitudinal direction or longitudinally extending path surrounding the sleeve 34. A cowl or cylindrical housing 48 is removably secured to the motor 12 in a manner as will be hereinafter set forth, and is concentrically disposed with respect to the shaft 16 and sleeve 34. An annular chamber 50 is thus defined between the outer periphery of the sleeve 34 and the inner periphery of the housing 48 for confining the exhaust air from the motor 12 and directing the air in a direction toward the machining element 14.

Figures 3, 4:
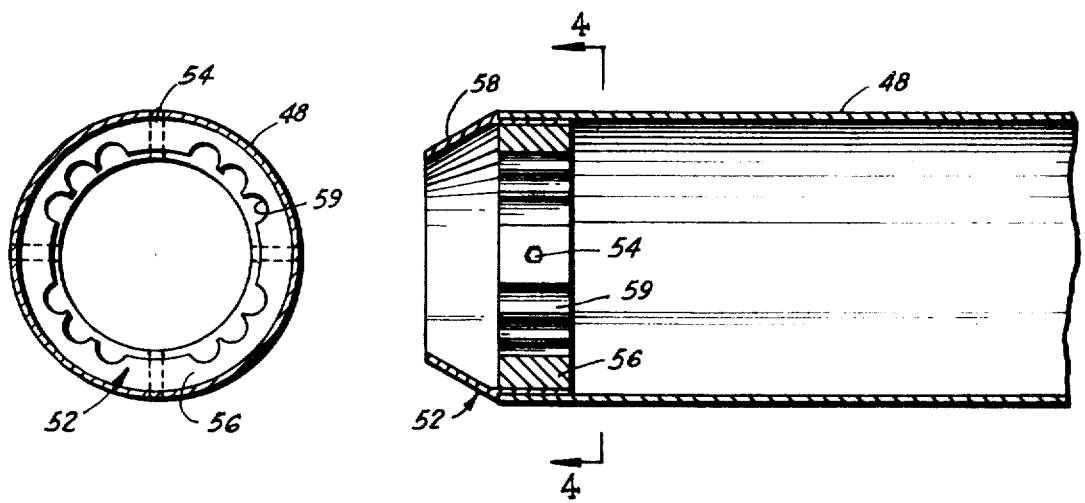
FIG. 3 is a broken sectional elevational view of the cowl or extension housing member embodying the invention.
FIG. 4 is a view taken on line 4—4 of FIG. 3.

A substantially funnel-shaped member 52 is secured in the outer end of the housing 48 in any suitable manner, such as by a plurality of spaced threaded members 54. The member 52 comprises an annular ring portion 56 disposed within the housing 48 and an inwardly tapered annular flange portion 58 which may be either integral with the ring 56 or may be a separate member as shown in FIG. 3. The inner periphery of the ring 56 is provided with a plurality of circumferentially spaced grooves or recesses 59 which provide fluid passageways extending from the chamber 50 to the interior of the tapered flange 58. The inner periphery of the flange 58 funnels or directs the air directly onto the machining element 14 for a purpose and as will be hereinafter set forth.

The housing 48 is secured to the sleeve 34 by means of the threaded setscrews 54 which extend inwardly through the ring 56 and bear against the outer periphery of the end cap 38. Thus, the housing 48 and sleeve 34 remain stationary while the shaft 16 rotates during operation of the device 10.

The machining element 14 comprises a body 60 having a shank portion 62 on one end thereof and a hardened cutting or grinding head 64 on the other end thereof. The grinding or cutting head 64 may be provided with substantially any desired configuration on the outer periphery for performing substantially any desired cutting, grinding, or other machining operation, and is preferably constructed from a tungsten carbide, or other suitable hardened metal. The shank portion 62 may be constructed of a less expensive suitable metal, as is well known. Of course, the two portions 62 and 64 are welded together or otherwise united wherein the machining element 14 is of a unitary structure. The shank portion 62 is provided with a longitudinally extending central bore 66 having internal threads complementary to the threaded end portion 30 of the shank 16. The design of the threads of the end portion 30 and bore 66 are such that the normal rotating direction of the shaft 16 during operation of the device 10 is in an opposite direction from the unthreading rotation direction between the complementary threads, thus precluding accidental loosening of the machining element 14 from the shaft 16 during operation of the device 10.

OPERATION

When it is desired to use the tool 10 for a cutting, grinding, or other machining operation, the cutting or machining element 14 is threadedly secured on the end 30 of the shaft 16. This is accomplished by manually grasping the nut 28 for temporarily precluding rotation of the shaft 16 which the element 14 is being threadedly secured thereto.

With the element 14 securedly disposed on the shaft 16 the motor 12 may be activated in the usual manner by producing a flow of air or power fluid therethrough in the well known manner. The actuation of the motor 12 causes the shaft 16, nut 28 and element 14 to rotate simultaneously therewith. As the motor 12 is operating, the power fluid or air is exhausted therefrom through the ports 46 in the plate 44. The exhaust air is contained within the chamber 50 and the force of the air causes the air to move longitudinally through the chamber 50. The air is discharged from the chamber 50 through the passageways 59 spaced around the end cap 38, and the generally funnel shape of the flange 58 directs the escaping air directly onto machining element 14.

Of course, the air is directed onto the elements 14 universal and continually throughout the operation of the motor 12 which maintains the frictional temperature between the cutting element 14 and the workpiece (not shown) as a minimum. This heat reduction not only greatly prolongs the useful life of the element 14, but also reduces the inherent damage or disadvantage of the extreme heat on the workpiece during a machining, cutting or grinding operation, or the like.

When it is necessary to replace the element 14 or remove the element 14 from the shaft 16 for any reason, the operation of the motor 12 is interrupted and the nut 28 may be manually grasped for holding the shaft 16 against rotation. The element 14 may then be readily unthreaded from the end portion 30 and may be quickly replaced by another element 14, if desired.

Whereas the particular embodiment of the invention depicted herein illustrates a shaft extension type arrangement wherein a cowling is provided for the output shaft of the air motor, it is to be understood that an air motor may be mounted directly within the cowling or housing 48, if desired, with only the threaded end portion 30 extending axially outwardly from the cowling 48 for receiving the element 14 thereon. As a practical matter it has been found that a motor for use within the housing 48 must be designed of a relatively smaller size than the motor presently available, and as a result it is economical, feasible and more expedient to provide the extension assembly for the readily available air motor of today.

From the foregoing it will be apparent that the present invention provides a novel machining tool comprising an air motor having a machining element secured directly to the output shaft thereof. The exhaust air from the air motor is channeled and funneled directly onto the machining element during operation of the device, thus greatly reducing heat from friction. This reduced frictional heat not only prolongs the useful life of the machining element, but also reduces disadvantages due to excessive heat on the workpiece. The novel tool is simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims, without departing from the spirit of the invention.

I claim:

1. A machining tool comprising an air motor having a rotatable drive shaft, a machining element removably secured directly to the outer extremity of the drive shaft for rotation simultaneously therewith, and means carried by the motor for directing the exhaust air from the motor directly onto the machining element during operation of the tool, wherein the last-mentioned means includes a housing member disposed concentrically with respect to the drive shaft for channeling the exhaust air from the air motor to the machining element, funneling means being provided on the outer end of the housing member for funneling the exhaust air directly onto the machining element, said funnel means including annular ring means secured within the housing in the proximity of the outer end thereof, fluid passageway means provided on the inner periphery of the ring means, and inwardly tapered flange means coterminous with the ring means for directing the exhaust air discharging through the fluid passageway means directly onto the machining element.

2. A machining tool comprising an air motor having a rotatable drive shaft, a machining element threadedly secured directly to the outer extremity of the drive shaft, support sleeve means carried by the motor and disposed concentrically with respect to the drive shaft, bearing means interposed between the drive shaft and support sleeve for facilitating rotation of the drive shaft and machining element, housing means carried by the motor and disposed concentrically with respect to the support sleeve to provide an annular chamber therebetween, aperture plate means secured to the motor for directing the exhaust air from the motor into the annular chamber, and funnel means provided on the housing means for directing the exhaust air from the chamber directly onto the machining element during operation of the tool, wherein said funnel means includes an annular support ring secured between the inner periphery of the housing and the outer periphery of the support sleeve, fluid passageway means provided in the support ring for directing the exhaust air from the annular chamber, and inwardly tapered flange means provided on the outer end of the housing for directing the air from the fluid passageway onto the machining element.